(12) United States Patent
Matsuo

(10) Patent No.: US 10,788,420 B2
(45) Date of Patent: Sep. 29, 2020

(54) GAS ANALYZER

(71) Applicant: YOKOGAWA ELECTRIC CORPORATION, Musashino-shi, Tokyo (JP)

(72) Inventor: Junichi Matsuo, Musashino (JP)

(73) Assignee: YOKOGAWA ELECTRIC CORPORATION, Musashino-shi, Tokyo (JP)

( * ) Notice: Subject to any disclaimer, the term of this patent is extended or adjusted under 35 U.S.C. 154(b) by 0 days.

(21) Appl. No.: 16/284,906

(22) Filed: Feb. 25, 2019

(65) Prior Publication Data
US 2019/0331595 A1 Oct. 31, 2019

Related U.S. Application Data

(60) Provisional application No. 62/662,231, filed on Apr. 25, 2018.

(51) Int. Cl.
*G01N 21/39* (2006.01)
*G01N 21/3504* (2014.01)
*G01N 21/55* (2014.01)
*G01N 21/85* (2006.01)

(52) U.S. Cl.
CPC ......... *G01N 21/39* (2013.01); *G01N 21/3504* (2013.01); *G01N 21/55* (2013.01); *G01N 21/8507* (2013.01); *G01N 2021/8578* (2013.01)

(58) Field of Classification Search
CPC .... G01N 21/39; G01N 21/3504; G01N 21/55; G01N 21/8507; G01N 2021/8578; G01J 3/42; G01J 3/021; G01J 3/0208; G01F 1/661; G01F 1/329; G01F 1/662; G01F 1/86; G01F 1/3209; G02B 5/122; G02B 27/14
USPC .................. 356/246, 335–343, 432–440
See application file for complete search history.

(56) References Cited

U.S. PATENT DOCUMENTS

| 5,781,306 | A | 7/1998 | Hartig et al. | |
| 8,934,101 | B2* | 1/2015 | Ido | G01N 21/61 356/437 |
| 9,244,003 | B1* | 1/2016 | Matsuo | G01N 21/39 |
| 2003/0090665 | A1 | 5/2003 | Kaufmann | |

(Continued)

FOREIGN PATENT DOCUMENTS

JP 2010185694 A 8/2010

*Primary Examiner* — Hoa Q Pham
(74) *Attorney, Agent, or Firm* — Kenja IP Law PC

(57) ABSTRACT

A gas analyzer has a probe member attachable to a flow path wall of a flow path through which an analyte gas flows and an analytical member having a second connection portion detachably attached to a first connection portion located at a base end. The probe member has a reflective portion and a measurement area defined therein for introducing the analyte gas. The analytical member has a light emission portion and a light reception portion. The light emission portion irradiates measurement light toward the measurement area, the reflection portion reflects the measurement light incident on the measurement area, and the light reception portion receives the measurement light reflected by the reflection portion. The probe member has a window portion isolating the measurement area from outside of the base end side and transmitting the measurement light.

7 Claims, 8 Drawing Sheets

(56) References Cited

U.S. PATENT DOCUMENTS

| | | | |
|---|---|---|---|
| 2013/0166242 A1* | 6/2013 | Ido | G01N 21/61 |
| | | | 702/104 |
| 2014/0183380 A1* | 7/2014 | Ukon | G01N 21/3504 |
| | | | 250/573 |
| 2014/0211209 A1* | 7/2014 | Ido | G01N 21/3504 |
| | | | 356/437 |
| 2017/0131199 A1* | 5/2017 | Skouboe | G01N 21/15 |
| 2019/0257749 A1* | 8/2019 | Hazama | G01J 3/06 |
| 2019/0310188 A1* | 10/2019 | Matsuo | G01N 21/39 |
| 2019/0316965 A1* | 10/2019 | Kobayashi | G01N 21/3504 |
| 2019/0317018 A1* | 10/2019 | Kobayashi | G01N 21/39 |
| 2019/0331511 A1* | 10/2019 | Kawashima | G01N 21/8507 |

* cited by examiner

GAS ANALYZER

CROSS-REFERENCE TO RELATED APPLICATION

This application claims the benefit of U.S. Provisional Application No. 62/662,231 filed Apr. 25, 2018, which is hereby incorporated by reference herein in its entirety.

TECHNICAL FIELD

The present disclosure relates to a gas analyzer.

BACKGROUND

Conventionally, there is known a gas analyzer that analyzes physical properties such as concentration of an analyte gas flowing through a predetermined flow path (see, for example, JP 2010-185694 A).

SUMMARY

A gas concentration measuring apparatus serving as the gas analyzer described in JP 2010-185694 A includes a probe member and a casing serving as an analytical member, and can analyze concentration as a property of an analyte gas by feeding a measurement light from a light emission portion in the analytical member through the analyte gas introduced in the probe member a reception portion in the analytical member where the measurement light is measured.

The gas analyzer described in JP 2010-185694 A has a drawback that if the analytical member is detached from the probe member, the analyte gas in the flow path is likely to leak through the inside of the probe member to the outside of the flow path.

It is therefore an object of the present disclosure to provide a gas analyzer capable of preventing leakage of an analyte gas in a flow path even when an analytical member is detached from a probe member.

A gas analyzer according to some embodiments comprises a probe member attachable to a flow path wall of a flow path through which an analyte gas flows in a state where a part thereof is inserted through an opening provided in the flow path wall, and an analytical member having a second connection portion detachably attached to a first connection portion located at a base end opposite to a direction of the probe member being inserted into the flow path. The probe member has a reflective portion and a measurement area defined therein for introducing the analyte gas. The analytical member has a light emission portion and a light reception portion. In a state where the analytical member is mounted to the probe member, the light emission portion irradiates measurement light toward the measurement area, the reflection portion reflects the measurement light incident on the measurement area, and the light reception portion receives the measurement light reflected by the reflection portion. The probe member has a window portion isolating the measurement area from outside of the base end side and transmitting the measurement light. In this way, since the probe member has the window portion and the window portion isolates the measurement area from the outside of the base end side and transmits the measurement light, the analyte gas in the flow path can be prevented from leaking even when the analytical member is removed from the probe member without interrupting the measurement of the analyte gas.

In one embodiment, the gas analyzer may further comprise a calibration member that has a third connection portion detachably attached to the second connection portion of the analytical member, a calibration reflection portion, and a calibration area defined therein for introducing the calibration gas, wherein, in a state where the calibration member is mounted to the analytical member, the light emission portion irradiates the measurement light toward the calibration area, the calibration reflection portion reflects the measurement light incident on the calibration area, and the light reception portion receives the measurement light reflected by the calibration reflection portion. In this way, the gas analyzer is further provided with the calibration member detachably attached to the analytical member, so that calibration can be performed with it. In addition, when the calibration member is transportable, the calibration can be performed without removing any pipes and wires connected to the analytical member before the measurement of the analyte gas. Furthermore, the configuration of the calibration member being detachable from the analytical member enables the calibration member to be removed during the measurement of the analyte gas, so that the size of the gas analyzer during the measurement of the analyte gas can be reduced and the likelihood of the calibration member being influenced by the heat from the analyte gas can be reduced.

In one embodiment of the gas analyzer, the calibration member may further comprise a fourth connection portion detachably attached to the first connection portion of the probe member, and the calibration member may be concurrently mounted to the probe member and the analytical member. In this way, when the calibration member can be concurrently mounted to the probe member and the analytical member, calibration can be performed while the probe member has been mounted to the flow path wall. That is, even when the analyte gas is flowing in the flow path, the gas analyzer can be calibrated.

In one embodiment of the gas analyzer, the analytical member may have an analytical window isolating the light emission portion and the light reception portion from outside of the second connection portion and transmitting the measurement light. In this way, since the analytical member has the analytical window portion and the analytical window portion isolates the light emission portion and the light reception portion from the outside of the second connection portion side and transmits the measurement light, the light emission part and the light reception part can be protected from the outside without interfering with the measurement of the gas.

In one embodiment of the gas analyzer, the analytical window part may include sapphire glass or borosilicate glass. In this way, a suitable material can be used for the analytical window portion depending on the necessity of explosion protection.

In one embodiment of the gas analyzer, the calibration area may extend over an area from the calibration reflection portion to the analytical window portion in a state where the calibration member is mounted to the analytical member. In this way, since the calibration area extends across the calibration member and the analytical member, it is not necessary to provide a window portion inside the calibration member and thus the manufacturing process can be simplified.

In one embodiment of the gas analyzer, the analytical member may be formed with a first communication hole for communicating the calibration area with the outside, and the calibration member may be formed with a second communication hole for communicating the calibration area with the outside. In this way, by providing the first communication hole and the second communication hole are provided at mutually different positions in the extending direction of the calibration area, the calibration area can be filled with the calibration gas in a short time.

In one embodiment of the gas analyzer, the calibration member may have a calibration window portion isolating the calibration reflector from outside of the third connection portion side and transmitting the measurement light, and the calibration area may extend over an area from the calibration reflection portion to the calibration window portion. In this way, by providing the calibration window portion, the optical path length absorbed by the calibration gas is defined only within the calibration member, so that the optical path length can be kept constant regardless of the connection state between the calibration member and the analytical member.

In one embodiment of the gas analyzer, the calibration member may be formed with a first communication hole for communicating the calibration area with the outside, and a second communication hole for communicating the calibration area with the outside at a position different from the first communication hole in the extending direction of the calibration area. In this way, by providing the first communication hole and the second communication hole at mutually different positions in the extending direction of the calibration area, the calibration area can be filled with the calibration gas in a short time.

According to the present disclosure, it is possible to provide a gas analyzer capable of preventing the leakage of the analyte gas in the flow path even when the analytical member is removed from the probe member.

DETAILED DESCRIPTION

Hereinafter, embodiments of the present disclosure will be discussed with reference to the attached drawings. It is noted that should the directions of front, rear, right, left, up and down as used herein should be referred to the directions of the arrows in the figures. The direction indicated by each arrow is consistent throughout the drawings.

Figure 1:
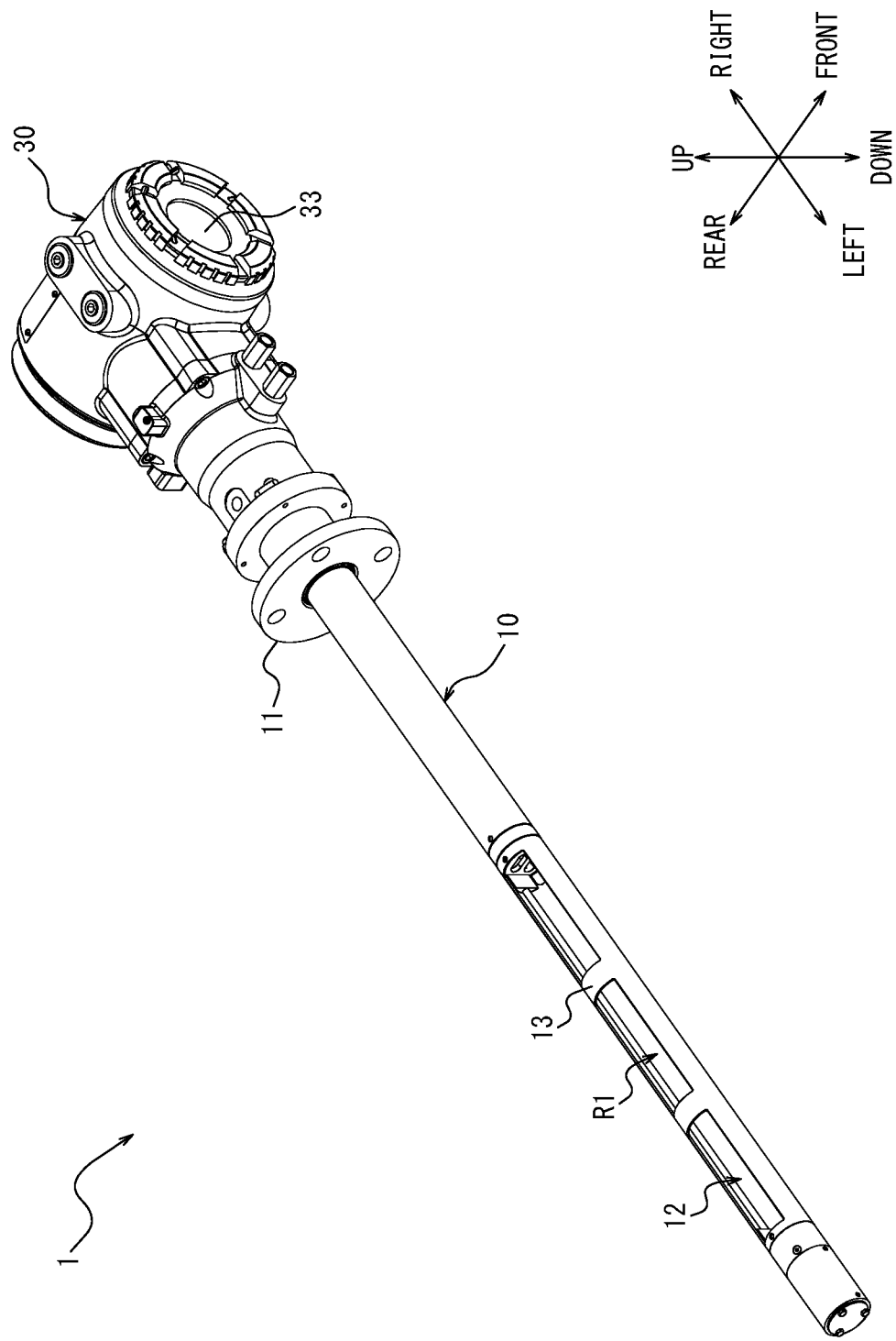
FIG. 1 is a top perspective view showing a gas analyzer according to a first embodiment of the present invention.
Figure 2:
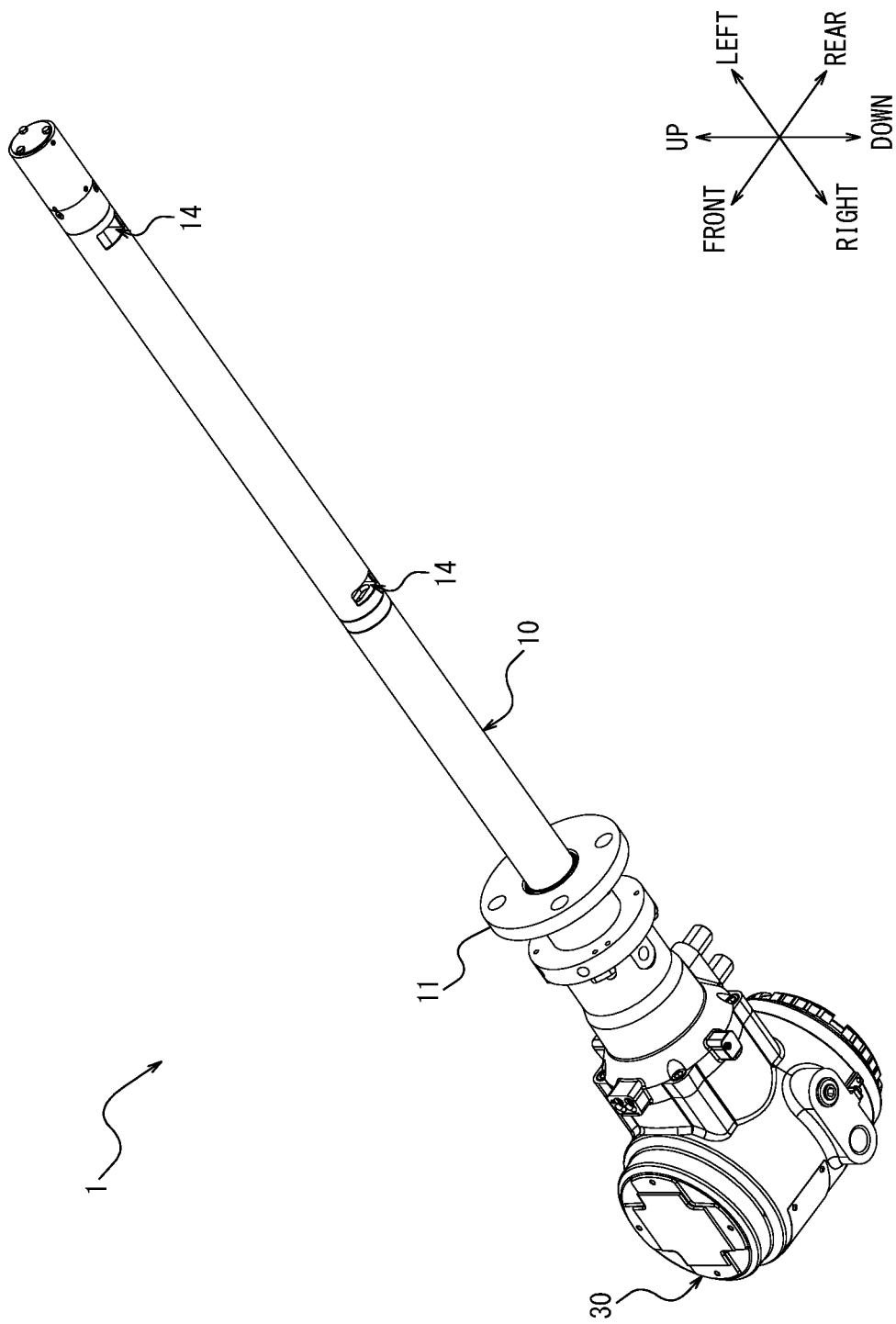
FIG. 2 is a bottom perspective view showing the gas analyzer of FIG. 1.
Figure 3:
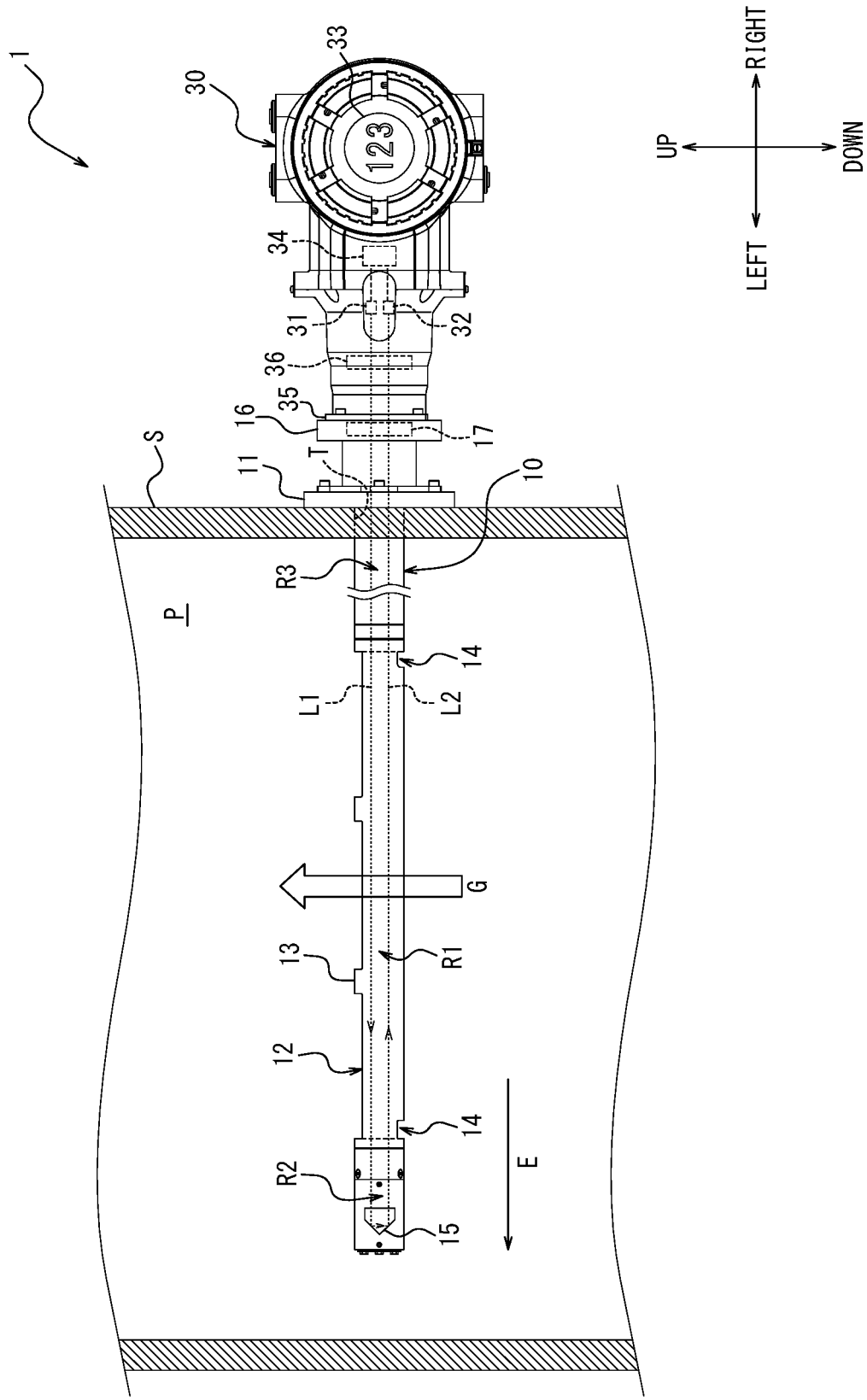
FIG. 3 is a top plan view illustrating a mode of use of the gas analyzer of FIG. 1 during measurement.
Figure 4:
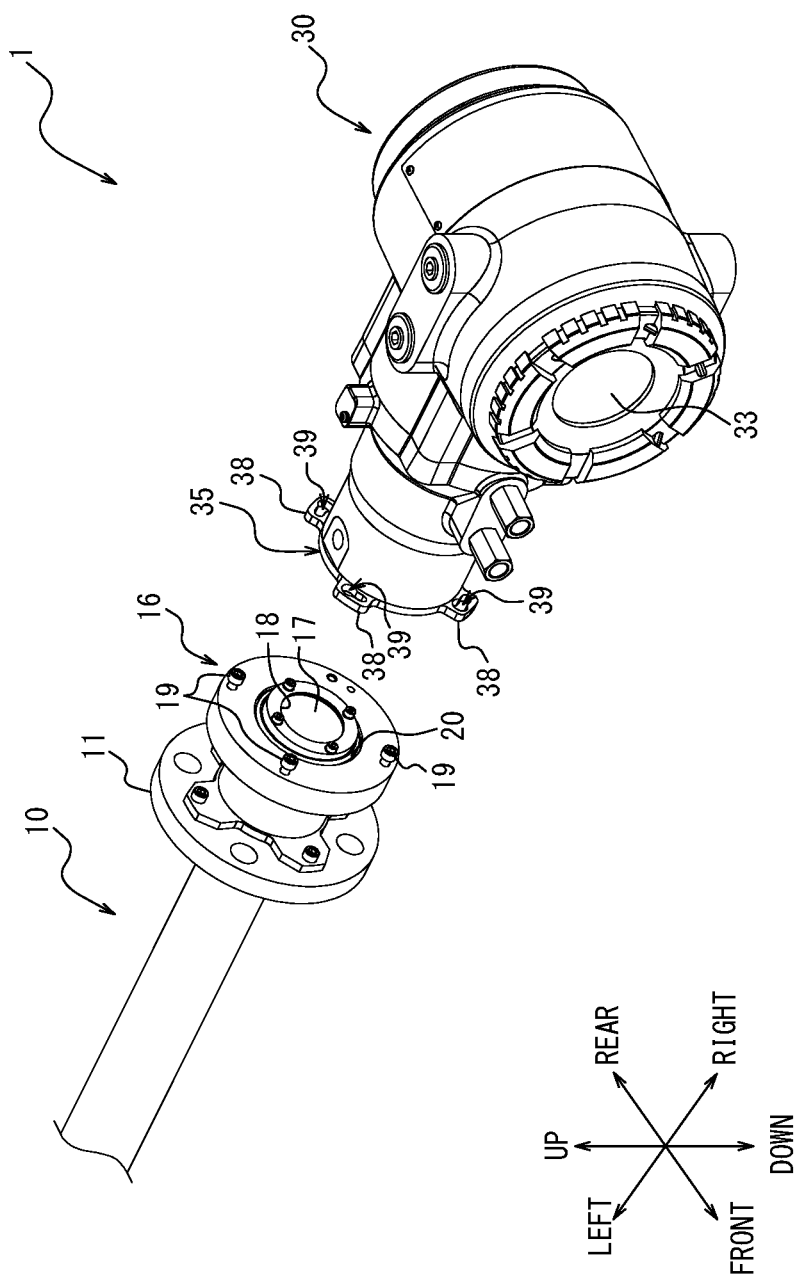
FIG. 4 is an exploded top perspective view of the gas analyzer of FIG. 1.

FIG. 1 is a top perspective view showing a gas analyzer 1 according to a first embodiment of the present disclosure. FIG. 2 is a bottom perspective view showing the gas analyzer 1. FIG. 3 is a top plan view illustrating a mode of use of the gas analyzer 1 during measurement. FIG. 3 shows an exemplified state in which the gas analyzer 1 is attached to a flow path wall S in order to measure a predetermined physical property value of an analyte gas G flowing in a flow path P. The flow path P is, for example, a pipe, a flue, a combustion furnace or the like. The predetermined physical property value of the analyte gas G includes, for example, a component concentration of the target component. FIG. 4 is an exploded top perspective view of the gas analyzer 1. In FIGS. 1 to 3, the gas analyzer 1 is shown in a state where the later-described analysis member 30 is mounted to the later-described probe member 10 in order to measure the predetermined physical property value of the analyte gas G (hereinafter referred to as a "first assembled state").

With reference to FIGS. 1 to 4, functions and configurations of the gas analyzer 1 according to the first embodiment in the first assembled state will be described.

As shown in FIG. 3, the gas analyzer 1 is, for example, attached directly to the flow path wall S of the flow path P through which the analyte gas G flows, and analyzes the component concentration of the targeted component. The analyte gas G contains gases such as CO, $CO_2$, $H_2O$, $C_nH_m$ (hydrocarbon), $NH_3$, and $O_2$.

The gas analyzer 1 is used in, for example, an explosion-proof field and includes a probe type TDLAS (Tunable Diode Laser Absorption Spectroscopy) gas sensor having a pressure-resistant and explosion-proof structure. The term "probe type" as used herein refers to a type of the gas analyzer 1 which, for example, integrally houses a light source, a reflecting structure, and a photodetector and has a structure of which one side is inserted into the flow path. The gas analyzer 1 analyzes the component concentration of the targeted component by irradiating the analyte gas G containing the process gas or the like with the laser light serving as the measurement light.

Gas molecules contained in the analyte gas G have optical absorption spectra due to vibration and rotational energy transitions of the molecules in the infrared to near infrared range. The absorption spectrum is unique to the component molecule. Absorbance of the measurement light by gas molecules is proportional to the constituent concentration and the optical path length according to the Lambert-Beer law. Therefore, the component concentration of the targeted component can be analyzed by measuring the absorption spectrum intensity.

TDLAS uses, as the measurement light, semiconductor laser light having a linewidth sufficiently narrower than an absorption linewidth of the energy transition of the gas molecules to irradiate the analyte gas G. By performing high-speed modulation of the drive current of the semiconductor laser, the wavelength of the measurement light is swept. The light intensity of the measurement light transmitted through the analyte gas G is measured to acquire one independent absorption spectrum.

The sweep range of the laser beam varies depending on the application. In case of the targeted component being 02, the linewidth of the laser light is, for example, 0.0002 nm, and the sweep width is, for example, 1 to 0.2 nm. The absorption spectrum is measured by sweeping the laser light with the sweep width of 0.1 to 0.2 nm. Concentration conversion is performed from the one acquired absorption spectrum to obtain the component concentration of the targeted component. Means for the concentration conversion include known methods such as the peak height method, the spectral area method, and the 2f method.

As shown in FIGS. 1 and 2, the gas analyzer 1 has a probe member 10 and an analytical member 30. As shown in FIGS.

1 to 3, in the gas analyzer 1 in the first assembled state, the analytical member 30 is mounted to the probe member 10.

As shown in FIG. 3, the probe member 10 can be attached to the flow path wall S in a state where a part thereof is inserted through an opening T formed in the flow path wall S of the flow path P through which the analyte gas G flows. For example, the probe member 10 is used in a predetermined direction with respect to the flowing direction of the analyte gas G. FIG. 3 shows an insertion direction E of the probe member 10 into the flow path P. In FIG. 3, the flow direction of the analyte gas G is indicated by an outlined arrow.

As shown in FIGS. 1 and 2, the probe member 10 of the present embodiment is, for example, a cylindrical object having a generally circular cross-sectional shape. The probe member 10 is formed of any metal member.

As shown in FIG. 1, the probe member 10 has an opening portion 12 extending in the left-right direction and opening upward. The probe member 10 has a plurality of ribs 13 provided in the opening portion 12 in order to maintain the strength of the probe member 10. As shown in FIG. 2, the probe member 10 has notches 14 formed by cutting out a part of the surface of the probe member 10 inwardly from the down side. The notches 14 are formed at respective positions generally corresponding to the left and right ends of the opening portion 12 in the left-right direction.

As shown in FIG. 3, the probe member 10 has a reflection portion 15 arranged adjacent to the left end (hereinafter also referred to as a "tip") of the internal space. The reflection portion 15 includes a certain structure for reflecting the measurement light such as a corner cube prism and a retroreflector. The reflection portion 15 reflects the measurement light from the later described light emission portion 31.

As shown in FIG. 3, the probe member 10 is supported with the majority thereof being placed inside the flow path P. Specifically, the gas analyzer 1 has an attachment portion 11 such as a flange formed on a part of the probe member 10, and the attachment portion 11 is attached to the outer surface of the flow path wall S, so that the probe member 10 is supported by the flow path wall S.

As shown in FIG. 3, the opening portion 12 exposes the corresponding inside of the probe member 10 into the flow path P. The notches 14 communicate the inside of the probe member 10 exposed into the flow path P via the opening portion 12 with the space inside the flow path P in the down direction from the inside of the probe member 10. The length from the left end of the probe member 10 to the left end of the attachment portion 11 along the extending direction of the probe member 10 is, for example, about 0.5 to 2 meters.

As shown in FIG. 4, the probe member 10 has a first connection portion 16 at the base end opposite to the insertion direction E to the flow path P. Further, as shown in FIG. 4, the analytical member 30 has a second connection portion 35 detachably attached to the first connection portion 16 of the probe member 10.

As shown in FIG. 3, the analytical member 30 in the first assembled state is connected to and supported by the first connection portion located outside of the flow path and at the right end (i.e., the end opposite to the tip provided with the reflection portion 15) of the probe member. As shown in FIG. 3, the analytical member 30 has a light emission portion 31 that irradiates the analyte gas G with the measurement light, a light reception portion 32 that receives the measurement light reflected by the reflection portion 15, a display portion 33, and an operation portion 34. The light emission portion 31, the light reception portion 32, the display portion 33, and the operation portion 34 are electrically connected to each other via, for example, a plurality of electronic boards. A casing of the analytical member 30 is, for example, a pressure-resistant and explosion-proof container that houses each of these components.

The light emission portion 31 has a certain light source capable of measuring the analyte gas G with TDLAS. The light emission portion 31 has, for example, a laser diode that emits a semiconductor laser. The light reception portion 32 has a certain photodetector capable of measuring the analyte gas G with TDLAS. The light reception portion 32 has, for example, a photodiode. A signal corresponding to a predetermined physical property value of the analyte gas G is output to the operation portion 34. The display portion 33 can display information of the predetermined physical property value of the analyte gas G, such as component concentration of a targeted component contained in the analyte gas G, measured by means of the light emission portion 31, the light reception portion 32, and the operation portion 34. The display portion 33 includes, for example, a liquid crystal display device. The operation portion 34 controls the overall operations of the gas analyzer 1 including the light emission portion 31, the light reception portion 32, and the display portion 33. The operation portion 34 has, for example, one or more processors. The operation portion 34 converts the signal input from the light reception portion 32 into the physical property value and displays the information of the physical property value on the display portion 33.

In the example shown in FIG. 3, the flow path P extends in the up-down direction, and the flow of the analyte gas G is directed from the down side to the up side. As shown in FIG. 3, the probe member 10 is used in a posture in which, with respect to such flow direction of the analyte gas G, the notch 14 faces downward, i.e., toward the upstream in the flow direction, and the opening portion 12 faces upward, i.e., toward the downstream in the flow direction. Thus, as described later, the area R2 and the area R3 can be filled with the purge gas while introducing and charging the analyte gas G into the measurement area R1. Here, the measurement area R1, the area R2, and the area R3 are spaces defined inside the probe member 10. The measurement area R1 is exposed to the flow path P via the opening portion 12. The area R2 is an area formed on the left side of the measurement area R1. The area R3 is an area formed on the right side of the measurement area R1.

As shown in FIG. 3, in the present embodiment, the insertion direction E of the probe member 10 into the flow path P is generally orthogonal to the flowing direction of the analyte gas G. The probe member 10 of the present embodiment extends in a direction generally orthogonal to the flow direction of the analyte gas G in the flow path P. Therefore, the analyte gas G flowing in the flow path P partially flows into the measurement area R1 inside the probe member 10 from the down side via the cutout 14. The analyte gas G also partially moves around the probe member 10 and flows into the measurement area R1 inside the probe member 10 from the up side via the opening portion 12. In this way, the analyte gas G flowing in the flow path P flows through the inside of the probe member 10. The analyte gas G flowing through the inside of the probe member 10 flows out again into the flow path P from, for example, the opening portion 12. In this way, the measurement area R1 is filled with the analyte gas G.

On the other hand, purge gas is supplied to the area R2 and the area R3 by a certain instrument. The purge gas prevents the analyte gas G from entering into the optical parts such as the reflecting part 15, the light emission part 31, and the light reception part 32 so that problems such as contamination and corrosion do not occur in these constituent parts. In this way, the area R2 and the area R3 are filled with the purge gas.

The notches 14 prevent the analyte gas G and the purge gas from mixing between the measurement area R1 and the area R2, and between the area R1 and the area R3. More specifically, the notches 14 guide the analyte gas G from the flow path P to the measurement area R1 inside the probe member 10 to prevent the entry of the purge gas into the measurement area R1. Simultaneously, the notches 14 prevent the entry of the analyte gas G into the area R2 and the area R3.

In the first assembled state, the light emission portion 31 emits the measurement light toward the measurement area R1 of the probe member 10. The measurement light incident on the measurement area R1 is directed to the reflection portion 15. In FIG. 3, the measurement light before being reflected by the reflection portion 15 is indicated as emitted light L1. The emitted light L1 passes through the inside of the probe member 10 extending so as to overlap with the measurement area R1 along its optical axis and is incident on the reflective portion 15. The reflection portion 15 is located adjacent to the tip of the probe member 10 on the side opposite to the light emission portion 31 and reflects the emitted light L1 that has passed through the measuring area R1. In FIG. 3, the measurement light reflected by the reflection portion 15 is indicated as reflected light L2. The reflected light L2 again passes through the inside of the probe member 10 including the measurement area R1. The light reception portion 32 receives the reflected light L2 reflected by the reflecting portion 15 and passing through the measurement area R1.

The light reception portion 32 electrically amplifies the measurement signal relating to the detected measurement light by a certain amplification circuit and then outputs the light detection intensity of the measurement light as a signal corresponding to a predetermined physical property value of the analyte gas G to the operation portion 34. A part of each of the emitted light L1 and the reflected light L2 is absorbed by the analyte gas G flowing through the measurement area R1 while passing through the inside of the probe member 10. By measuring the absorption spectrum based on the measurement signal acquired by the light reception portion 32, the component concentration of the targeted component in the analyte gas G is obtained.

As shown in FIGS. 3 and 4, the probe member 10 has a probe window portion 17. As shown in FIG. 3, the probe window portion 17 isolates the measurement area R1 from the outside of the base end (the right end in FIG. 3). More specifically, the probe window portion 17 prevents the analyte gas G in the measurement area R1 from flowing out to the outside through the base end opening 18 (see FIG. 4) defined at the base end of the probe member 10. Further, the probe window portion 17 prevents the external gas or the like from flowing into the measurement area R1 through the base end opening 18. As shown in FIG. 3, the probe window portion 17 transmits the measurement light, i.e., the emitted light L1 and the reflected light L2.

As shown in FIG. 4, the probe window portion 17 of the present embodiment is arranged so as to hermetically cover the base end opening 18. Preferably, the probe window portion 17 has pressure resistance sufficient to withstand the pressure from the analyte gas G. The probe window portion 17 includes, for example, borosilicate glass.

Figure 7:
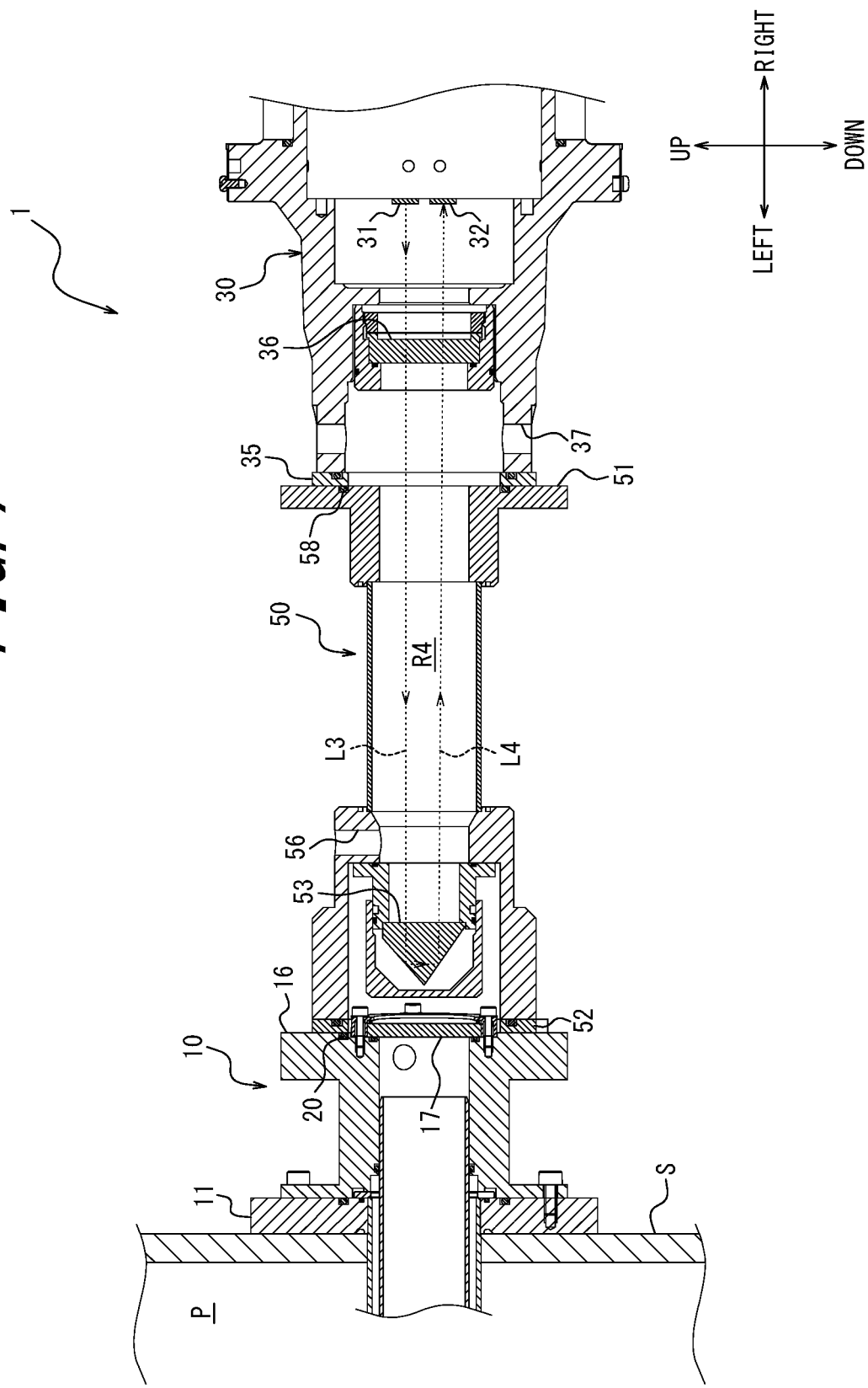
FIG. 7 is a cross-sectional view showing a mode of use of the gas analyzer of FIG. 1 during calibration.

As shown in FIG. 3, the analytical member 30 has an analytical window portion 36. As shown in FIG. 7 which will be described later, the analytical window part 36 isolates the light emission part 31 and the light reception part 32 from the outside of the second connecting part 35 side. As shown in FIG. 3, the analytical window portion 36 transmits the measurement light, i.e., the emitted light L1 and the reflected light L2. In this way, the analytical window portion 36 can transmit the measurement light while protecting the light emission portion 31 and the light reception portion 32 from the outside.

The analytical window portion 36 includes, for example, sapphire glass or borosilicate glass. More specifically, the analytical window 36 is made of, for example, sapphire glass when the gas analyzer 1 is required to be explosion-proof, such as when the gas analyzer 1 is installed in an explosion-proof field (zone 1). Sapphire glass has high transparency and high flexural strength and is therefore suitable for use in, for example, the explosion-proof field (zone 1). Further, when the gas analyzer 1 is installed in an explosion-proof field (zone 2), the analytical window portion 36 is made of, for example, borosilicate glass. Although borosilicate glass is weaker than sapphire glass, it is cheaper, has higher distribution characteristics, and therefore is suitable for use in, for example, an explosion-proof field (zone 2).

As shown in FIG. 4, the first connection portion 16 located at the base end (the right end in FIG. 4) of the probe member 10 of the present embodiment has a constraining screw 19 protruding to the base end side. In the example shown in FIG. 4, a plurality of the constraining screws 19 are provided on the first connection portion 16 and are arranged at substantially the same distance from the center of the base end face of the first connection portion 16 and at different positions in circumferential direction. As shown in FIG. 4, the second connection portion 35 located at the tip (the left end in FIG. 4) of the analytical member 30 of the present embodiment has protrusions 38 protruding outward in a plane (an upper-lower and front-rear plane in FIG. 4) orthogonal to the axial direction (the left-right direction in FIG. 4) of the analytical member 30. The protrusion 38 is formed with a keyhole 39 running therethough in the axial direction of the analytical member 30. The keyhole 39 has a first inner diameter portion which is larger than the outer diameter of the head portion of the constraining screw 19 and a second inner diameter portion which is smaller than the outer diameter of the head portion of the constraining screw 19 and larger than the outer diameter of the cylindrical portion of the constraining screw 19. In the example shown in FIG. 4, the second connection portion 35 has a plurality of protrusions 38 and a plurality of keyholes 39, and the plurality of keyholes 39 are arranged at substantially the same distance from the center of the tip face of the second connection portion 35 and at different positions in the circumferential direction. The distance from the center of the base end surface of the first connection portion 16 to the constraining screw 19 and the distance from the center of the tip surface of the second connection portion 35 to the keyhole 39 are substantially equal.

The first connection portion 16 and the second connection portion 35 are brought closer to each other in the left-right direction to allow the head portion of the constraining screw 19 to pass through the first inner diameter portion of the keyhole 39. Then, the second connection portion 35 is turned with respect to the first connection portion 16 around the axis extending in the left-right direction, so that the constraining screw 19 moves into the second inner diameter portion, and the first connection portion 16 and the second connection portion 35 are connected. This enables to easily attach/detach the probe member 10 to/from the analytical member 30 simply by changing the positional relationship between the first connection portion 16 and the second connection portion 35 without attaching/detaching the constraining screw 19.

As shown in FIG. 4, a groove portion 20 is formed around the base end opening 18 of the first connection portion 16. For example, an O-ring can be installed in the groove portion 20. This can improve the airtightness between the first connection portion 16 and the second connection portion 35 in a state where the first connection portion 16 and the second connection portion 35 are connected. Moreover, when the first connecting part 16 is connected to a fourth connecting part 52 of a calibration member 50, which will be described later, the airtightness between the first connecting part 16 and the fourth connecting part 52 can be improved.

When the probe type gas analyzer 1 as described above is attached to an installation site in the first assembled state, each optical component of the light emission portion 31, the reflection portion 15, and the light reception portion 32 satisfies a predetermined condition which includes a positional relationship of the components such that the emitted light L1 from the light emission portion 31 passes through the measurement area R1 and is reflected by the reflection portion 15, and the reflected light L2 again passes through the measurement area R1 and enters the light reception portion 32. The reflection portion 15 may not be arranged symmetrically in the circumferential direction of the probe member 10. Therefore, in a state where the first connection portion 16 and the second connection portion 35 are connected, the positional relationship between the probe member 10 and the analytical member 30 in the circumferential direction is preferably fixed.

The above-described gas analyzer 1 needs to be calibrated (zero and span) at regular intervals or when a trouble occurs. In case of performing the calibration with a conventional technique, an operator such as a field technician firstly removes any pipes and cables connected to the gas analyzer 1. Thereafter, the operator loosens fixation of the attachment portion 11 to the flow path wall S, withdraws the probe member 10 from the flow path wall S, and removes the entire gas analyzer 1 from the flow path P. Then, the gas analyzer 1 is transported to an environment where the calibration can be performed, an enclosed environment is created around the probe member 10 such as by covering the probe member 10, and required pipes and wires are attached. Thereafter, a calibration gas (zero gas or span gas) of a known concentration is introduced from the purge gas line to create a state where the probe member 10 is filled with the calibration gas. The concentration of the gas is measured, and the actual concentration and the measurement value of the calibration gas are compared to carry out zero-span calibration. When the calibration is completed, the pipes and wires are removed again, the gas analyzer 1 is transported to the original installation site and attached to the flow path wall S via the attachment part 11, and the removed pipes and cables are attached.

When calibration is carried out in this way, it is necessary to attach/detach the cables and attach/detach the probe member 10 to/from the flow path wall S every time the calibration is performed, which can be a burden to the operator. In addition, the analyte gas G flowing through the flow path P has high temperature (about 400 to 500° C.) during operation of the furnace, and is often corrosive or toxic. The analyte gas G may leak from the opening T of the flow path wall S upon detaching or attaching the probe member 10 from or to the flow path wall S, and thus improvement in safety is still needed.

Figure 5:
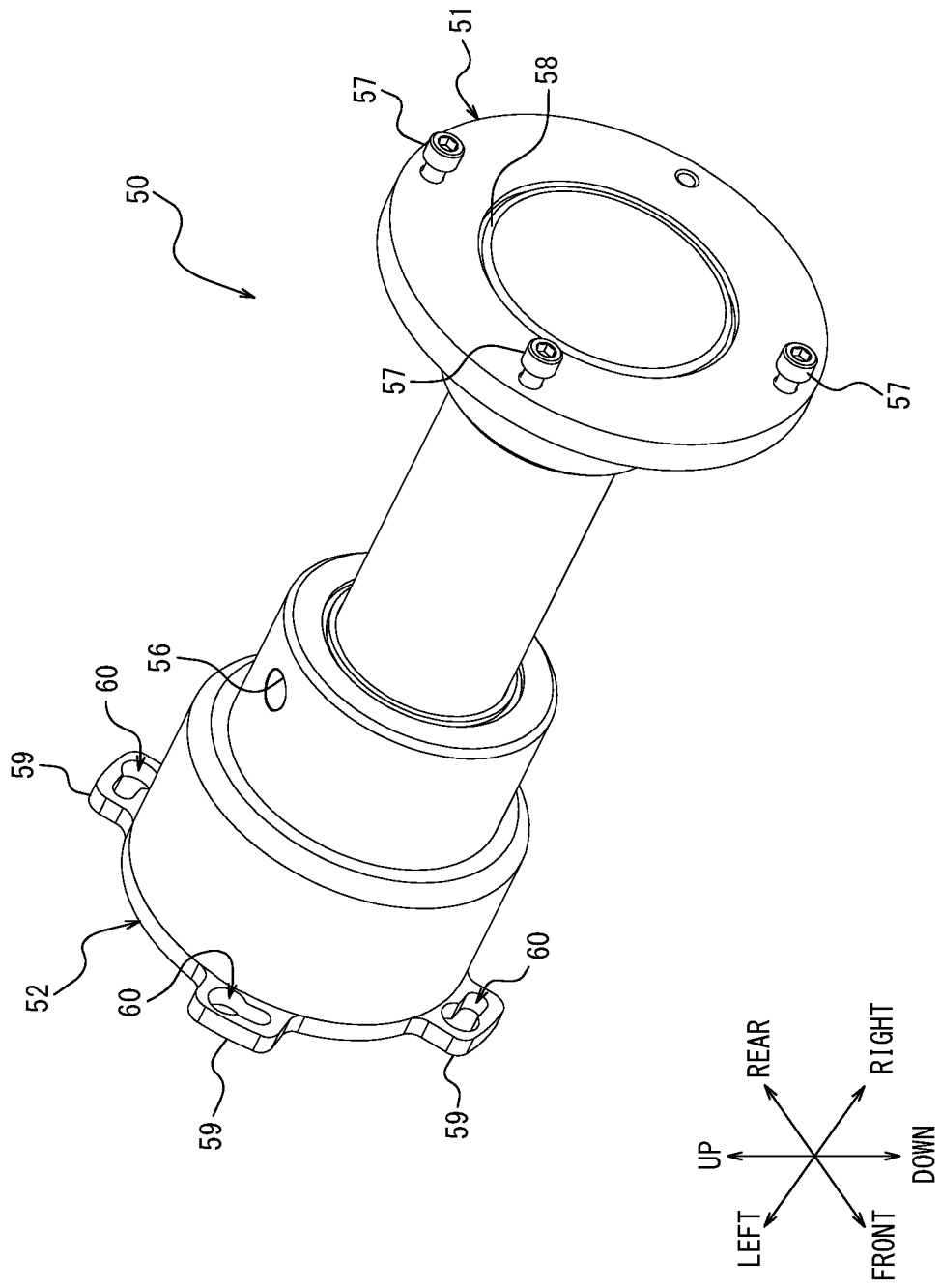
FIG. 5 is a top perspective view showing the calibration member of the gas analyzer of FIG. 1.

Therefore, the gas analyzer 1 of the present embodiment further comprises a calibration member 50. FIG. 5 is a top perspective view showing the calibration member 50 provided in the gas analyzer 1. As shown in FIG. 5, the calibration member 50 has a third connection portion 51 and a fourth connection portion 52.

Figure 6:
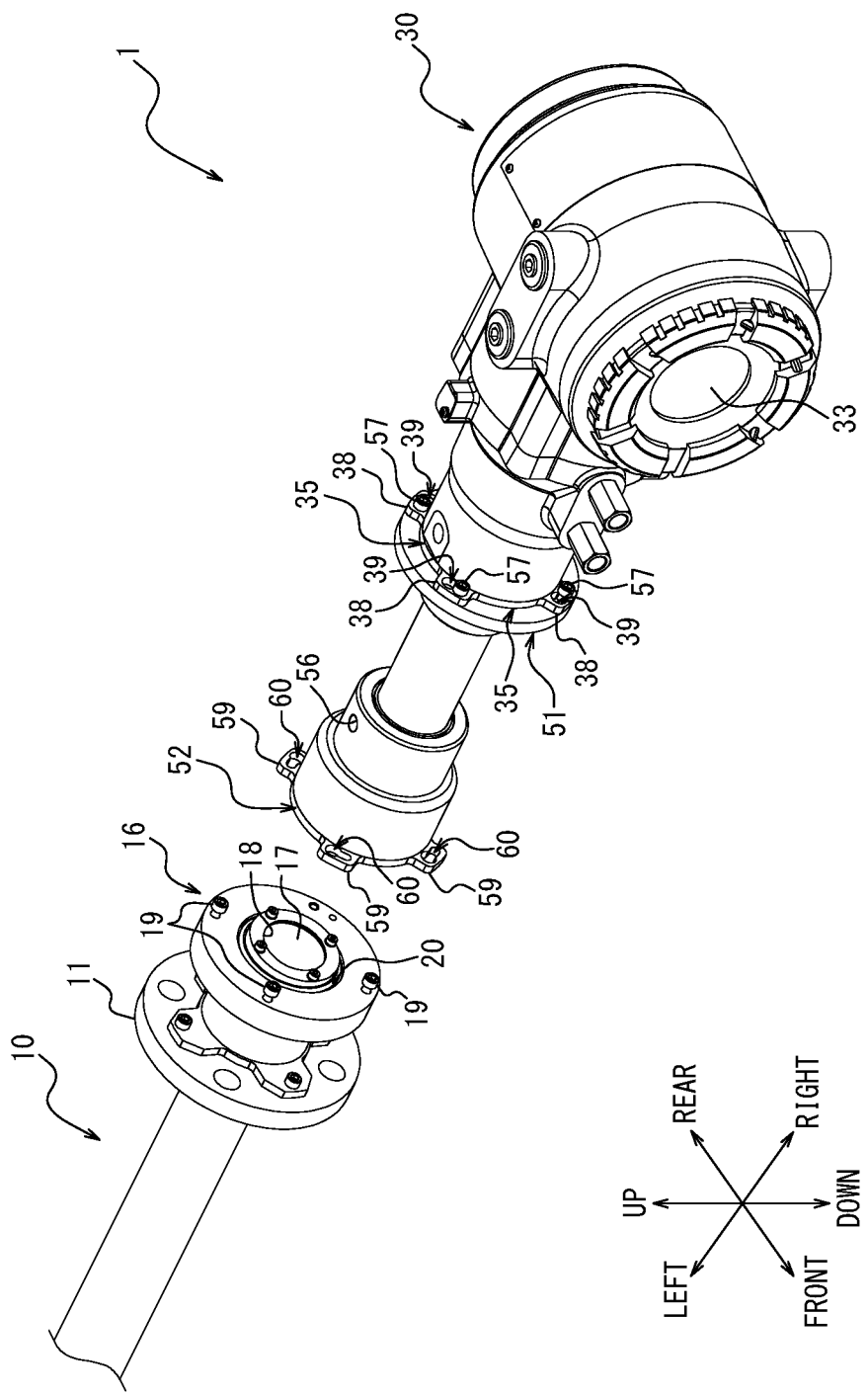
FIG. 6 is a top perspective view showing a state where the calibration member is being connected to the probe member and the analytical member.

FIG. 6 is a top perspective view showing a state where the calibration member 50 is being connected to the probe member 10 and the analytical member 30. In the example shown in FIG. 6, the calibration member 50 is mounted to the analytical member 30 and is not mounted to the probe member 10. However, the calibration member 50 can be concurrently mounted to the probe member 10 and the analytical member 30. As shown in FIG. 6, the third connection portion 51 of the calibration member 50 can be detachably attached to the second connection portion 35 of the analytical member 30. Further, the fourth connection portion 52 of the calibration member 50 is attachably detached from the first connection portion 16 of the probe member 10.

The calibration member 50 is mounted only during the calibration of the gas analyzer 1 and is removed as described above during the normal measurement. When the gas analyzer 1 is transformed from the measurement mode as shown in FIG. 3 to the calibration mode, the analytical member 30 is removed from the probe member 10 while the probe member 10 remains attached to the flow path wall S. Further, the third connection portion 51 of the calibration member 50 is mounted to the second connection portion 35 of the analytical member 30 and the fourth connection portion 52 of the calibration member 50 is mounted to the first connection portion 16 of the probe member 10. In this connection, by having arranged the pipes and the wires connected to the analytical member 30 to allow to move in a certain distance range, it is possible to eliminate the necessity of detachment and attachment of the pipes and the wires during the transformation between the measurement mode and the calibration mode.

As shown in FIGS. 5 and 6, the third connection portion 51 located at the base end (the right end in FIG. 5) of the calibration member 50 of the present embodiment has a constraining screw 57 protruding to the base end side. In the examples shown in FIGS. 5 and 6, a plurality of the constraining screws 57 are provided in the third connection portion 51 and are arranged at substantially the same distance from the center of the base end face of the third connection portion 51 and at different positions in the circumferential direction. The constraining screws 57 may have the same shape as the constraining screws 19 of the first connection portion 16 of the probe member 10. The distance from the center of the base end surface of the third connection portion 51 to the constraining screw 57 is substantially equal to the distance from the center of the tip surface of the second connection portion 35 of the analytical member 30 to the keyhole 39.

As shown in FIG. 6, after bringing the second connection portion 35 and the third connection portion 51 closer to each other in the left-right direction, the head portion of the constraining screw 57 is passed from the first inner diameter portion of the keyhole 39. The constraining screw 57 moves to the position of the second inner diameter portion by rotating the second connection portion 35 with respect to the third connection portion 51 around the axis extending in the left-right direction, so that the second connection portion 35 and the third connection portion 51 are connected. Thus, by simply changing the positional relationship between the second connection portion 35 and the third connection portion 51, the analysis member 30 and the calibration member 50 can be attached and detached easily without attaching and detaching the constraining screws 57.

As shown in FIG. 5, a groove portion 58 is formed around the opening of the base end surface of the third connection portion 51. An O-ring, for example, can be installed in the groove 58. This can improve the airtightness between the third connection portion 51 and the second connection portion 35 in a state where the third connection portion 51 and the second connection portion 35 are connected.

As shown in FIGS. 5 and 6, the fourth connection portion 52 located at the tip end (the left end in FIG. 5) of the calibration member 50 of the present embodiment has protrusions 59 protruding outward in a plane (the upper-lower and front-rear plane in FIG. 5) orthogonal to the axial direction (the left-right direction in FIG. 5) of the calibration member 50. The protrusions 59 define a keyhole 60 running therethrough in the axial direction of the calibration member 50. The keyhole 60 has a first inner diameter portion which is larger than the outer diameter of the head portion of the constraining screw 19 and a second inner diameter portion which is smaller than the outer diameter of the head portion of the constraining screw 19 and which is larger than the outer diameter of the cylindrical portion of the constraining screw 19. In the example shown in FIG. 5, the fourth connection portion 52 has a plurality of the protrusions 59 and a plurality of the keyholes 60, and the keyholes 60 are arranged at substantially the same distance from the center of the tip surface of the fourth connection portion 52 and at different positions in the circumferential direction. The distance from the center of the tip surface of the fourth connection portion 52 to the keyhole 60 is substantially equal to the distance from the center of the base end surface of the first connection portion 16 to the constraining screw 19.

As shown in FIG. 6, after bringing the first connection portion 16 and the fourth connection portion 52 closer to each other in the left-right direction, the head portion of the constraining screw 19 is passed from the first inner diameter portion of the keyhole 60. The constraining screw 19 moves to the position of the second inner diameter portion by rotating the fourth connection portion 52 with respect to the first connection portion 16 around the axis extending in the left-right direction, so that the first connection portion 16 and the fourth connection portion 52 are connected. Thus, by simply changing the positional relationship between the first connection portion 16 and the fourth connection portion 52, the probe member 10 and the calibration member 50 can be attached and detached easily without attaching and detaching the constraining screws 19.

FIG. 7 is a cross-sectional view showing a mode of use of the gas analyzer 1 during the calibration. As shown in FIG. 7, in order to perform the calibration with the calibration gas, the gas analyzer 1 of the second usage mode is in a state where the calibration member 50 is mounted to the probe member 10 and the analytical member 30 (hereinafter, also referred to as "second assembled state").

As shown in FIG. 7, the calibration member 50 has a calibration reflection portion 53 arranged adjacent to the left end of the internal space. Similar to the reflection portion 15 of the probe member 10 (see FIG. 3), the calibration reflection portion 53 includes a certain reflecting structure for reflecting the measurement light such as a corner cube prism and a retroreflector. The calibration reflection portion 53 reflects the measurement light from the light emission portion 31.

As shown in FIG. 7, the calibration member 50 have a calibration area R4 defined therein for introducing the calibration gas and extending in the left-right direction. As shown in FIG. 7, in a state where the calibration member 50 is mounted to the analytical member 30 (the second assembled state in the example shown in FIG. 7), the calibration area R4 extends over an area from the calibration reflection portion 53 to the analytical window portion 36. As shown in FIG. 7, in the present embodiment, the analytical member 30 is formed with a first communication hole 37 for communicating the calibration area R4 with the outside, and the calibration member 50 is formed with a second communication hole 56 for communicating the calibration area R4 with the outside. One of the first communication hole 37 and the second communication hole 56 is used as a gas introduction hole for introducing the calibration gas from the outside into the calibration area R4, and the other is used as a gas discharge hole for discharging the calibration gas in the calibration area R4 to the outside. In this way, the gas introduction and discharge hole are used to fill the calibration area R4 with the calibration gas. Furthermore, since the gas introduction and discharge holes are provided at mutually different positions in the extending direction of the calibration area R4, the calibration area R4 can be filled with the calibration gas in a short time. As the calibration gas, zero gas can be used for zero calibration, and span gas can be used for span calibration.

As shown in FIG. 7, in a state where the calibration member 50 is mounted to the analytical member 30 (the second assembled state in the example shown in FIG. 7), the light emission portion 31 emits the measurement light toward the calibration area R4. The measurement light incident on the calibration area R4 is directed to the calibration reflection portion 53. In FIG. 7, the measurement light before being reflected by the calibration reflection portion 53 is indicated as the emitted light L3. The emitted light L3 passes through the inside of the calibration member 50 extending so as to overlap the calibration area R4 along the optical axis thereof and is incident on the calibration reflection portion 53. The calibration reflection portion 53 is positioned adjacent to the left end opposite to the light emission portion 31 in the calibration member 50 and reflects the emitted light L3 incident on the calibration area R4. In FIG. 7, the measurement light after being reflected by the calibration reflection portion 53 is indicated as reflected light L4. The reflected light L4 passes again through the inside of the calibration member 50 including the calibration area R4. The light reception portion 32 receives the reflected light L4 reflected by the calibration reflection portion 53 and passing through the calibration area R4.

The emitted light L3 and the reflected light L4 are partially absorbed by the calibration gas while passing through the calibration area R4. As the concentration of the calibration gas in the calibration area R4 has been known, the measured value of the concentration of the calibration gas obtained from the reflected light L4 received by the light reception portion 32 can be compared with the calculated value of the concentration of the calibration gas to carry out zero-span calibration. The optical path length absorbed by the calibration gas is twice the distance along the extending direction of the calibration area R4, i.e., the distance between the calibration reflection portion 53 and the analytical window portion 36.

Figure 8:
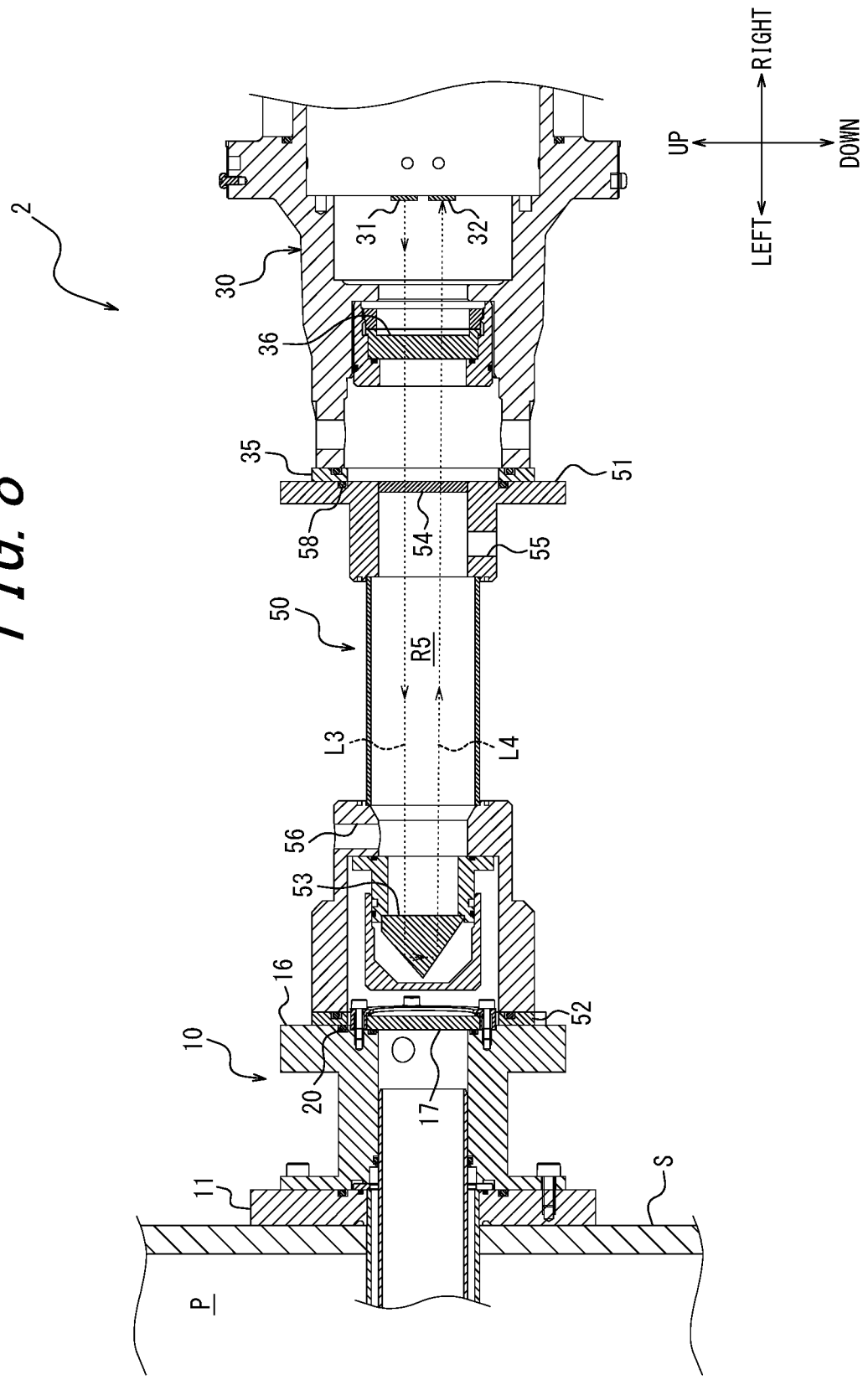
FIG. 8 is a cross-sectional view showing a mode of usage of the gas analyzer according to the second embodiment of the present disclosure during calibration.

FIG. 8 is a cross-sectional view showing a usage mode of the gas analyzer 2 according to the second embodiment of the present disclosure during calibration. As shown in FIG. 8, similarly to the gas analyzer 1 according to the first embodiment, the gas analyzer 2 according to the present embodiment includes a probe member 10, an analytical member 30, and a calibration member 50. The calibration member 50 of the present embodiment has the same structure with that of the calibration member 50 of the first embodiment except that it has a calibration window portion 54 and is formed with a first communication hole 55. Further, the probe member 10 and the analytical member 30 of the present embodiment are identical with the probe member 10 and the analytical member 30 of the first embodiment, respectively.

As shown in FIG. 8, the calibration window portion 54 isolates the calibration reflection portion 53 from the outside of the third connecting section 51 side. As shown in FIG. 8, the calibration window portion 54 transmits the measurement light, i.e., the emitted light L3 and the reflected light L4. In this way, the calibration window portion 54 can transmit the measurement light while protecting the calibration reflection portion 53 from the outside.

The calibration window portion 54 is arranged so as to hermetically cover the opening defined in the third connection section 51 of the calibration member 50. The calibration window portion 54 preferably has pressure resistance sufficient to withstand the pressure from the calibration gas. The calibration window portion 54 includes, for example, borosilicate glass. A coating for preventing reflection of the measurement light is preferably applied to the calibration window portion 54. Suitable coating may be selected according to the wavelength of the measurement light.

In the present embodiment, since the calibration member 50 has the calibration window portion 54, the calibration gas does not flow into the analytical member 30 side beyond the calibration window portion 54. Therefore, the calibration area R5 of the present embodiment extends over the area from the calibration reflection portion 53 to the calibration window portion 54. In this case, the optical path length absorbed by the calibration gas is twice the distance along the extending direction of the calibration area R5, i.e., the distance between the calibration reflection portion 53 and the calibration window portion 54. Therefore, since the optical path length absorbed by the calibration gas is defined only within the calibration member 50, the optical path length can be kept constant regardless of the connection state between the calibration member 50 and the analytical member 30.

As shown in FIG. 8, the calibration member 50 of the present embodiment is formed with a first communication hole 55 for communicating the calibration area R5 with the outside and a second communication hole 56 for communicating the calibration area R5 with the outside of a position (at the left side in FIG. 8) different from the first communication hole in the extending direction of the calibration area R5. One of the first communication hole 55 and the second communication hole 56 is used as a gas introduction hole for introducing the calibration gas from the outside into the calibration area R5, and the other is used as a gas discharge hole for discharging the calibration gas in the calibration area R5 to the outside. In this way, the gas introduction hole and the gas discharge hole are used to fill the calibration area R5 with the calibration gas. Furthermore, since the gas introduction hole and the gas discharge hole are provided at mutually different positions in the extending direction of the calibration area R5, the calibration area R5 can be filled with the calibration gas in a short time. Zero gas can be used as the calibration gas for zero calibration, and span gas can be used as the calibration gas for span calibration.

As described above, the gas analyzers 1, 2 according to the first and second embodiments each include a probe member 10 capable of being attached to a flow path wall S of a flow path P through which an analyte gas G flows in a state where a part thereof is inserted in the flow path P through an opening T provided in the flow path wall S, and an analytical member 30 having a second connection part 35 detachably attached to a first connection portion 16 located at a base end opposite to a direction E of the probe member being inserted into the flow path P, wherein the probe member 10 has a reflection portion 15 and a measurement area R1 defined therein for introducing an analyte gas G; the analytical member 30 has a light emission portion 31 and a light reception portion 32; in a state where the analytical member 30 is mounted to the probe member 10, the light emission portion 31 irradiates measurement light L1 toward the measurement area R1, the reflection portion 15 reflects the measurement light L1 incident on the measurement area R1, and the light reception portion 32 receives the measurement light L2 reflected by the reflection portion 15; and the probe member 10 has a probe window portion 17 isolating the measurement area R1 from the outside of the base end side and transmitting the measurement lights L1, L2. In this way, since the probe member 10 has the probe window portion 17 and the probe window portion 17 isolates the measurement area R1 from the outside of the base end side and transmits the measurement lights L1 and L2, it is possible to prevent the analyte gas G in the flow path P from leaking without interfering with the measurement of the analyte gas G even when the analytical member 30 is removed from the probe member 10.

Further, the gas analyzers 1, 2 according to the first and second embodiments each further include a calibration member 53 having a third connection portion 51 detachably attached to the second connection portion 35 of the analytical member 30, a calibration reflection portion 53, and calibration area R4, R5 defined therein for introducing the calibration gas, wherein in a state where the calibration member 50 is mounted to the analytical member 30, the light emission portion 31 irradiates measurement light L3 toward the calibration area R4, R5, the calibration reflection portion 53 reflects the measuring beam L3 incident on the calibration area R4, R5, and the light reception portion 32 receives the measurement light L4 reflected by the calibration reflection portion 53. In this way, since the gas analyzers 1, 2 each are further provided with the calibration member 50 detachably attached to the analytical member 30, calibration can be performed with it. Further, when the calibration member 50 is transportable, the calibration can be performed without removing any pipes and wires connected to the analytical member 30 before the measurement of the analyte gas G. Furthermore, the configuration of the calibration member 50 being detachable from the analytical member 30 enables the calibration member 50 to be removed during the measurement of the analyte gas G, so that the size of the calibration member 50 during the measurement of the analyte gas G can be reduced and the likelihood of the calibration member being influenced by the heat from the analyte gas G can be reduced.

In the gas analyzers 1 and 2 according to the first and second embodiments, the calibration member 50 further has a fourth connection portion 52 detachably attached to the first connection portion 16 of the probe member 10, and the calibration member 50 can be concurrently mounted to the probe member 10 and the analytical member 30. In this way, since the calibration member 50 can be concurrently mounted to the probe member 10 and the analytical member 30, calibration can be performed while the probe member 10 is attached to the flow path wall S. That is, even when the analyte gas G is flowing through the flow path P, the gas analyzer 1 can be calibrated.

In the gas analyzers 1 and 2 according to the first and second embodiments, the analytical member 30 has an analytical window portion 36 isolating the light emission portion 31 and the light reception portion 32 from the outside of the second connection portion 35 side and transmitting the measurement lights L1 to L4. In this way, since the analytical member 30 has the analytical window portion 36 and the analytical window portion 36 isolates the light emission portion 31 and the light reception portion 32 from the outside of the second connection portion 35 side and transmits the measurement lights L1 to L4, the light emission portion 31 and the light reception portion 32 can be protected from the outside without interfering with the measurement of the gas.

In the gas analyzers 1 and 2 according to the first and second embodiments, the analytical window portion 36 includes sapphire glass or borosilicate glass. In this way, a suitable material can be used for the analytical window 36 depending on the necessity of explosion proof.

In the gas analyzer 1 of the first embodiment, the calibration area R4 extends over the area from the calibration reflection portion 53 to the analytical window portion 36 in a state where the calibration member 50 is mounted to the analytical member 30. In this way, when the calibration area R4 extends across the calibration member 50 and the analytical member 30, it is not necessary to provide a window portion inside the calibration member 50, and thus the manufacturing process can be simplified.

In the gas analyzer 1 according to the first embodiment, the analytical member 30 is formed with a first communication hole 37 for communicating the calibration area R4 with the outside, and the calibration member 50 is formed with a second communication holes 56 for communicating the calibration area R4 with the outside. In this way, by providing the first communication hole 37 and the second communication hole 56 at different positions in the extending direction of the calibration area R4, the calibration area R4 can be filled with the calibration gas in a short time.

In the gas analyzer 2 according to the second embodiment, the calibration member 50 has a calibration window portion 54 isolating the calibration reflector 53 from the outside of the third connection portion 51 side and transmitting the measurement lights L3, L4, and the calibration area R5 extends over the area from the calibration reflection portion 53 to the calibration window portion 54. In this way, by providing the calibration window portion 54, the optical path length absorbed by the calibration gas is defined only within the calibration member 50, so that the optical path length can be kept constant regardless of the connection state between the calibration member 50 and the analytical member 30.

In the gas analyzer 2 of the second embodiment, the calibration member 50 is formed with a first communication hole 55 for communicating the calibration area R5 with the outside and a second communication hole 56 for communicating the calibration area R5 with the outside of at a position different from the first communication hole 55 in the extending direction of the calibration area R5. In this way, by providing the first communication hole 55 and the second communication hole 56 at mutually different positions in the extending direction of the calibration area R5, the calibration area R5 can be filled with the calibration gas in a short time.

The present disclosure is not limited to the configurations specified in the above embodiments, and various modifications are possible without departing from the scope of the following claims.

The invention claimed is:

1. A gas analyzer comprising:
a probe member attachable to a flow path wall of a flow path through which an analyte gas flows in a state where a part thereof is inserted through an opening provided in the flow path wall,
an analytical member having a second connection portion detachably attached to a first connection portion located at a base end opposite to a direction of the probe member being inserted into the flow path, and
a calibration member that has a third connection portion detachably attached to the second connection portion of the analytical member, a calibration reflection portion, and a calibration area defined therein for introducing the calibration gas, wherein
the probe member has a reflective portion and a measurement area defined therein for introducing the analyte gas;
the analytical member has a light emission portion and a light reception portion;
in a state where the analytical member is mounted to the probe member, the light emission portion irradiates measurement light toward the measurement area, the reflection portion reflects the measurement light incident on the measurement area, and the light reception portion receives the measurement light reflected by the reflection portion;
the probe member has a base end opening provided at the first connection portion and a window portion hermetically covering the base end opening to isolate the measurement area from outside of the base end side and transmitting the measurement light;
in a state where the calibration member is mounted to the analytical member, the light emission portion irradiates the measurement light toward the calibration area, the calibration reflection portion reflects the measurement light incident on the calibration area, and the light reception portion receives the measurement light reflected by the calibration reflection portion; and
the calibration member further has a fourth connection portion detachably attached to the first connection portion of the probe member, and the calibration member is capable of being concurrently mounted to the probe member and the analytical member.

2. The gas analyzer according to claim 1, wherein the analytical member has an analytical window isolating the light emission portion and the light reception portion from outside of the second connection portion and transmitting the measurement light.

3. The gas analyzer according to claim 2, wherein the analytical window part includes sapphire glass or borosilicate glass.

4. The gas analyzer according to claim 2, wherein the calibration area extends over an area from the calibration reflection portion to the analytical window portion in a state where the calibration member is mounted to the analytical member.

5. The gas analyzer according to claim 4, wherein the analytical member is formed with a first communication hole for communicating the calibration area with the outside, and the calibration member is formed with a second communication hole for communicating the calibration area with the outside.

6. The gas analyzer according to claim 1, wherein the calibration member has a calibration window portion isolating the calibration reflector from outside of the third connection portion side and transmitting the measurement light, and the calibration area extends over an area from the calibration reflection portion to the calibration window portion.

7. The gas analyzer according to claim 6, wherein the calibration member is formed with a first communication hole for communicating the calibration area with the outside, and a second communication hole for communicating the calibration area with the outside at a position different from the first communication hole in the extending direction of the calibration area.

\* \* \* \* \*